US 10,947,875 B2

(12) United States Patent
Muramatsu

(10) Patent No.: US 10,947,875 B2
(45) Date of Patent: Mar. 16, 2021

(54) PCV VALVE MOUNTING STRUCTURE

(71) Applicant: AISAN KOGYO KABUSHIKI KAISHA, Obu (JP)

(72) Inventor: Rikako Muramatsu, Konan (JP)

(73) Assignee: AISAN KOGYO KABUSHIKI KAISHA, Obu (JP)

(*) Notice: Subject to any disclaimer, the term of this patent is extended or adjusted under 35 U.S.C. 154(b) by 158 days.

(21) Appl. No.: 15/676,239

(22) Filed: Aug. 14, 2017

(65) Prior Publication Data

US 2018/0051606 A1 Feb. 22, 2018

(30) Foreign Application Priority Data

Aug. 17, 2016 (JP) .............................. JP2016-159996

(51) Int. Cl.
*F01M 13/00* (2006.01)
*F02M 25/06* (2016.01)

(52) U.S. Cl.
CPC ........ *F01M 13/0011* (2013.01); *F02M 25/06* (2013.01); *F01M 2013/0077* (2013.01); *Y02T 10/12* (2013.01)

(58) Field of Classification Search
CPC ....... F01M 13/0011; F01M 2013/0077; F02M 25/06
USPC ......................................................... 123/574
See application file for complete search history.

(56) References Cited

U.S. PATENT DOCUMENTS 8,955,501 B2  2/2015  Tanikawa et al.
9,790,827 B2  10/2017  Yamada et al.

2011/0203559 A1* 8/2011 Tanikawa ............. F01M 13/023
                                                         123/572
2014/0182716 A1* 7/2014 Yamada ................ F16K 15/026
                                                         137/535
2015/0114369 A1  4/2015  Tanikawa et al.

FOREIGN PATENT DOCUMENTS

JP  2011-169258 A   9/2011
JP  2011-236854 A   11/2011
JP  2012-188942 A   10/2012
JP   2016089694 A    5/2016

OTHER PUBLICATIONS

Japanese Office Action dated Aug. 19, 2019, for Japanese Application No. 2016-159996 (3 p.).
English Translation of Japanese Office Action dated Aug. 19, 2019, for Japanese Application No. 2016-159996 (3 p.).

* cited by examiner

*Primary Examiner* — Lindsay M Low
*Assistant Examiner* — Omar Morales
(74) *Attorney, Agent, or Firm* — Conley Rose, P.C.

(57) ABSTRACT

A PCV valve mounting structure includes a cylinder head of an engine, an intake manifold coupled with the cylinder head to form a blow-by gas passage. A PCV valve is disposed in the blow-by gas passage. The PCV valve includes a valve case and a plurality of seal members elastically supporting the valve case on the cylinder head and the intake manifold. The PCV valve is configured to control a flow rate of the blow-by gas depending on the negative intake pressure of the engine. The PCV valve has a measuring passage configured to adjust the flow rate of the blow-by gas and positioned upstream of the seal members. An annular space is formed between the cylinder head and the valve case. The annular space extends in the lengthwise longitudinal axial direction from an upstream end of the valve case.

2 Claims, 2 Drawing Sheets

PCV VALVE MOUNTING STRUCTURE

CROSS-REFERENCE TO RELATED APPLICATIONS

This application claims priority to Japanese patent application serial number 2016-159996, filed Aug. 17, 2016, the contents of which are incorporated herein by reference in its entirety for all purposes.

STATEMENT REGARDING FEDERALLY SPONSORED RESEARCH OR DEVELOPMENT

Not applicable.

BACKGROUND

This disclosure relates generally to positive crankcase ventilation (PCV) valve mounting structures.

The PCV valve, which is generally mounted on a vehicle, such as automobile, controls the flow rate of blow-by gas returned from an internal combustion engine crankcase to the engine's intake passage.

A conventional PCV valve mounting structure will be described based on FIG. 3, which illustrates a cross-sectional view thereof. As shown in FIG. 3, a cylinder head 100 of an engine includes an upstream side blow-by gas passage 102 therein. An intake manifold 104 includes a downstream side blow-by gas passage 106 therein. The cylinder head 100 is coupled to the intake manifold 104 such that the blow-by gas passages 102, 106 are in fluid communication with each other, thereby forming a continuous blow-by gas passage. A PCV valve 108, which controls the flow rate of blow-by gas through passages 102, 106 depending on the negative intake pressure of the engine, is disposed at an interface between the cylinder head 100 and the intake manifold 104. The PCV valve 108 extends into both blow-by gas passages 102, 106. A fitting recess 110 having a large diameter is formed at an open end of the upstream side blow-by gas passage 102.

The PCV valve 108 includes a valve case 114, a valve member 116, and a valve spring 118. The valve case 114 is formed in a hollow cylindrical shape and includes a main case 114a and a subcase 114b, which are made from a resin material and are coaxially aligned in a longitudinal axial direction (the horizontal direction as shown in FIG. 3). A valve seat 122 is coaxially disposed between the main case 114a and the subcase 114b. The valve seat 122 is made from a metal material and is formed in an annular disk shape oriented perpendicular to the longitudinal horizontal axis, and includes a measuring hole 122a. The valve member 116 is housed in the valve case 114 in an axially movable manner along the direction of the longitudinal horizontal axis such that the tapered frontal tip of valve member 116 can change a passage cross-sectional area at the measuring hole 122a of the valve seat 122 depending on an axial position of the valve member 116 relative to the valve seat 122. An annular measuring passage 124 is defined by an inner peripheral edge of the measuring hole 122a of the valve seat 122 along the circumference of its annular opening, and an outer circumferential surface (in more detail, a measuring surface) of the valve member 116. The valve spring 118 biases the valve member 116 toward the upstream direction away from subcase 114b (leftward in FIG. 3). An upstream side end part of the valve case 114 (mainly, the main case 114a) is fitted within the fitting recess 110 of the upstream side blow-by gas passage 102 of the cylinder head 100. In contrast, a downstream side end part of the valve case 114 (an end part of the subcase 114b) is fitted in a smaller-diameter open end of the downstream side blow-by gas passage 106 of the intake manifold 104.

The main case 114a is provided with a first O-ring 126. The first O-ring 126 elastically supports the fitting of the main case 114a within the cylinder head 100 and elastically provides a seal between the cylinder head 100 and the main case 114a. The subcase 114b is provided with a second O-ring 128. The second O-ring 128 elastically supports the fitting of the subcase 114b within the intake manifold 104 and elastically provides a seal between the intake manifold 104 and the subcase 114b. The conventional PCV valve mounting structure is disclosed in Japanese Laid-Open Patent Publication No. JP2011-169258A.

BRIEF SUMMARY

In an aspect of this disclosure, a PCV valve mounting structure includes a cylinder head of an engine, an intake manifold coupled with the cylinder head to form a blow-by gas passage. The PCV valve is disposed in the blow-by gas passage. The PCV valve includes a valve case and a plurality of seal members elastically supporting the valve case on the cylinder head and the intake manifold. The PCV valve is configured to control a flow rate of the blow-by gas depending on the negative intake pressure of the engine. The PCV valve has a measuring passage configured to adjust the flow rate of the blow-by gas and positioned upstream of the seal members. An annular space is formed between the cylinder head and the valve case. The annular space extends in the lengthwise longitudinal axial direction from an upstream end of the valve case.

According to this aspect, the measuring passage is positioned upstream of the seal member in the longitudinal axial direction of the PCV valve, and the annular space between the cylinder head and the valve case extends in the longitudinal axial direction from the upstream end of the valve case. Thus, the blow-by gas can flow into the space between the cylinder head and the valve case, enabling heat to be efficiently transferred from the blow-by gas to the measuring passage, which is positioned upstream of the seal member. As a result, the measuring passage of the PCV valve may easily receive heat from the blow-by gas in this space, which can help in shortening time to get rid of the freezing effect of the measuring passage.

Other objects, features and advantage of the present teaching will be readily understood after reading the following detailed description together with the accompanying drawings and the claims.

BRIEF DESCRIPTION OF THE DRAWINGS

For a detailed description of the preferred embodiments of the invention, reference will now be made to the accompanying drawings in which.

DETAILED DESCRIPTION

Figure 1:
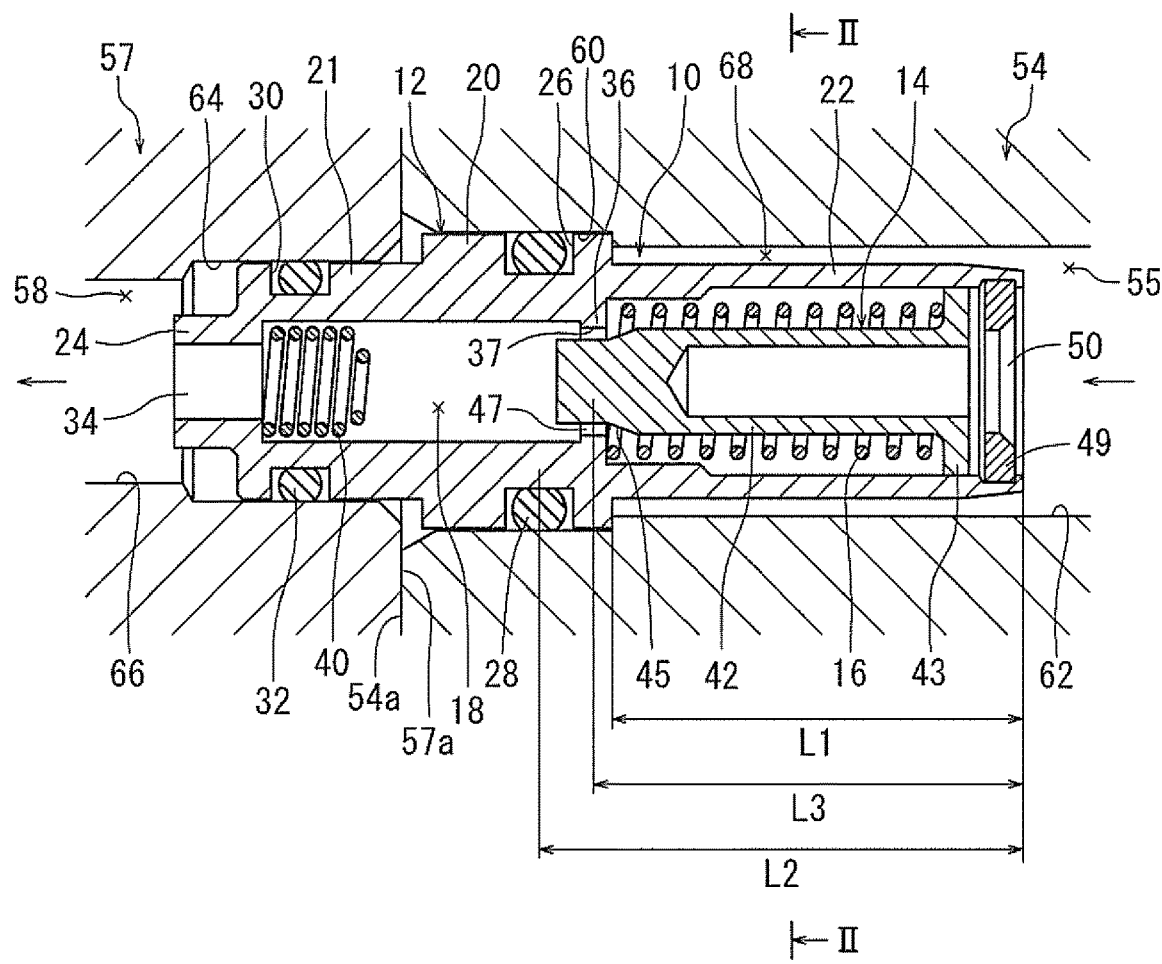
FIG. 1 is a cross-sectional side view of an embodiment of a PCV valve mounting structure in accordance with principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections.

Each of the additional features and teachings disclosed above and below may be utilized separately or in conjunction with other features and teachings to provide improved PCV valve mounting structures. Representative examples of the present teachings, which examples utilized many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the claimed subject-matter. Only the claims define the scope of the claimed subject-matter. Therefore, combinations of features and steps disclosed in the following detailed description may not be necessary to practice the claimed subject-matter in the broadest sense, and are instead taught merely to particularly describe representative examples of the present teachings. Moreover, various features of the representative examples and the dependent claims may be combined in ways that are not specifically enumerated in order to provide additional useful embodiments of the present teachings.

Figure 3:
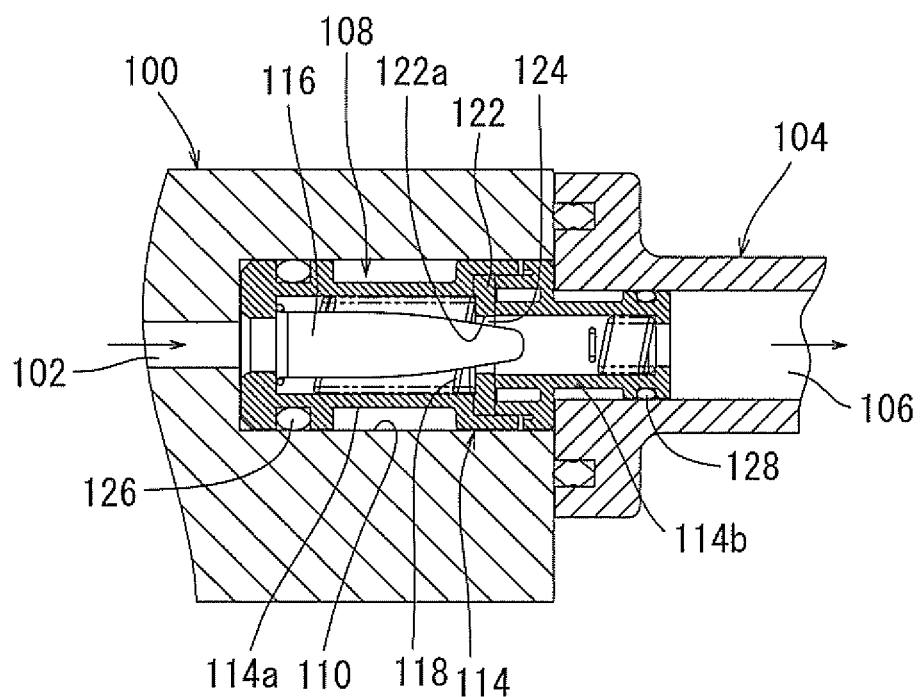
FIG. 3 is a cross-sectional side view of a conventional PCV valve mounting structure.

In the conventional PCV valve mounting structure shown in FIG. 3, the O-ring 126 elastically supports the fitting of the main case 114a within the valve case 114 on the cylinder head 100, and limits the transfer of thermal energy from the cylinder head 100 to the measuring passage 124 of the PCV valve 108. As a result, moisture in the blow-by gas may freeze at the measuring passage 124 of the PCV valve 108 in a low-temperature situation, e.g., in cold environment or the like. Furthermore, in the longitudinal horizontal axial direction of the PCV valve 108, the measuring passage 124 is positioned downstream (at the right side in FIG. 3) of the first O-ring 126, and the first O-ring 126 is placed at an upstream end part (a left end part in FIG. 3) of the main case 114a. Accordingly, because of the elastic fit that said O-ring 126 provides, the blow-by gas flowing through the upstream side blow-by passage 102 cannot flow into a space between the cylinder head 100 and the main case 114a, preventing heat from the blow-by gas from efficiently being transferred to the measuring passage 124. Accordingly, there is a need for improved PCV valve mounting structures.

Figure 2:
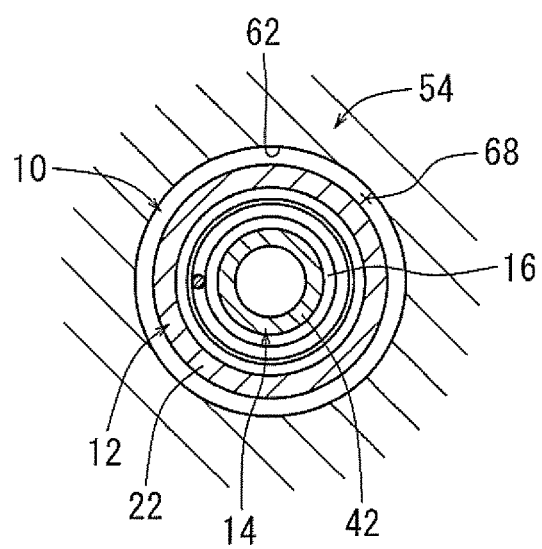
FIG. 2 is a cross-sectional view of the PCV valve mounting structure of FIG. 1 taken along section II-II of FIG. 1.

An embodiment of a PCV valve mounting structure in accordance with the principles described herein is shown in FIGS. 1 and 2. FIG. 1 is a cross-sectional view of the PCV valve mounting structure, and FIG. 2 is a cross-sectional view of the PCV valve mounting structure taken along section II-II of FIG. 1.

As shown in FIG. 1, a positive crankcase ventilation (PCV) valve 10 includes a valve case 12, a valve member 14, and a valve spring 16. The valve case 12 is made from a durable rigid material such as a metal material and is formed as a hollow cylindrical shape. A communication passage 18 is composed of hollow space defined by the interior of the cylindrical valve case 12 and extends linearly in the longitudinal axial direction of the valve case 12 (in the horizontal direction in FIG. 1). The blow-by gas flows in the valve case 12 through the communication passage 18 in a right-to-left direction in FIG. 1. For purposes of clarity and further explanation, the terms "rear" and "front" may be used to describe locations relative to the direction of flow of the blow-by gas through PCV valve 10 with "rear" generally referring to locations upstream of another location and "front" referring to locations downstream of another location. Thus, for example, the upstream side or end of a given component may be referred to herein as the "rear" side or end, respectively, and the downstream side or end of the component may be referred to as the "front" side or end of the component, respectively. As another example, the upstream side of the communication passage 18 of the valve case 12, at the beginning of the flow path of the blow-by gas, is referred to as the "rear side", whereas the downstream side of the communication passage 18, occurring at a later point in the flow path of the blow-by gas, is referred to as the "front side."

The valve case 12 is formed as a stepped cylindrical shape, which includes a large outer diameter portion 20, a front small outer diameter portion 21, and a rear small outer diameter portion 22, with portions 20, 21, 22 being coaxially aligned with each other with respect to the longitudinal axial direction of the valve 10. The large diameter portion 20 is generally disposed along the middle portion of the PCV valve 10 lengthwise, in the longitudinal axial direction of the valve 10. That is, it is positioned between the front small diameter portion 21 and the rear small diameter portion 22 along the longitudinal axis of the valve 10. A tip end portion 24, also included as part of the valve case 12, is coaxially aligned with portions 20, 21, 22 and extends from the front small diameter portion 21 to the front end of valve case 12. Tip end portion 24 has a smaller outer diameter than the front small diameter portion 21. A first O-ring groove 26 is formed in an annular shape on the outer peripheral circumferential surface of the large diameter portion 20, orthogonal to the longitudinal axis of the valve. A first annular O-ring 28 is seated in the first O-ring groove 26. A second O-ring groove 30 is formed in an annular shape on the outer peripheral circumferential surface of the front small diameter portion 21, also orthogonal to the longitudinal axis of the valve. A second annular O-ring 32 is seated in the second O-ring groove 30. The first and second O-rings 28, 32 function as "seal members".

An inner passage wall surface defining the communication passage 18 is formed in a stepped shape such that an inner diameter thereof gradually decreases in a tiered manner moving in the rear-to-front direction. The tip end portion 24 defines a gas outlet 34 therein. A valve seat 36 is integrally and coaxially formed at the rear end of the large diameter portion 20. The valve seat 36 is formed as part of the valve case 12 as a radially inward projecting annular flange that decreases the diameter of the communication passage 18. The valve seat 36 defines within its radial interior a circular through hole, which is referred to as a measuring hole 37. Although the valve seat 36 is formed as part of valve case 12 in this embodiment, in other embodiments, the valve seat 36 may be replaced with a valve seat member formed separately from the valve case 12.

A cushion spring 40 comprising a metal coil spring is provided at the front end portion of the front small diameter portion 21. The cushion spring 40 elastically prevents the valve member 14 from excessively moving downstream. The cushion spring 40 is inserted into the communication passage 18 through an open rear end of the valve case 12, and then is disposed in the front end part of the valve case 12 via the measuring hole 37. The cushion spring 40 is supported by the rear facing front end of the front small diameter portion 21, which functions as a spring seat.

The valve spring 16 comprises a metal coil spring. The valve spring 16 is inserted into the communication passage 18 through the open rear end of the valve case 12 such that the valve spring 16 is supported by the rear facing side of the valve seat 36, which functions as a spring seat. The valve spring 16 biases the valve member 14 towards the rear direction, i.e., the upstream side of the communication passage 18 (rightward in FIG. 1).

The valve member 14 is made from a metal or resin material and includes a valve body 42 and a flange 43. The valve body 42 is formed as a hollow cylindrical shape having a front closed end and a rear open end. The flange 43 is formed as a polygonal shape extending radially outward at the rear end of the valve body 42. The front end of the valve body 42 has as a radially-inward tapered shape with an exterior peripheral circumferential surface referred to as measuring surface 45. The valve body 42 may be formed as a solid.

The valve member 14 is inserted into the communication passage 18 through the open rear end of the valve case 12 and is disposed in the communication passage 18 in a movable manner lengthwise, in the longitudinal axial direction (in the horizontal direction in FIG. 1). The valve body 42 is located within the valve spring 16. The flange 43 is supported by a rear end of the valve spring 16. The flange 43 slidingly engages the passage wall surface, i.e., the inner circumferential surface of the rear small diameter portion 22. The passage wall surface of the rear small diameter portion 22 and an outer circumferential surface of the flange 43 define openings (not shown) through which the blow-by gas flows into the communication passage 18. More specifically, the openings are defined between the passage wall surface at the rear portion of the small diameter portion 22 and the exterior peripheral radial surface of the flange 43, where said surface comprises smaller radial-length portions corresponding to lateral surfaces of a polygonal shape of the flange 43.

A front end portion of the valve body 42 is located within the measuring hole 37 of the valve seat 36. An edge of the measuring hole 37 of the valve seat 36 and the measuring surface 45 of the valve member 14 collectively define an annular measuring passage 47. As the valve member 14 retreats, i.e., moves toward the upstream side, along with the valve member's tapered measuring surface 45, an effective open area, i.e., a passage cross-sectional area of the measuring passage 47 increases. Conversely, as the valve member 14 advances, i.e., moves toward the downstream side, along with the valve member's tapered measuring surface 45, the passage cross-sectional area of the measuring passage 47 decreases. Because the valve seat 36 is located at the rear end portion of the large diameter portion 20, the measuring passage 47 is positioned upstream (at the right side in FIG. 1) of the first O-ring 28 lengthwise in the longitudinal axial direction of the PCV valve 10.

An annular retaining member 49 is coaxially fitted in the open rear end of the valve case 12. The retaining member 49 is fixed on the valve case 12 by swaging or the like. The retaining member 49 prevents the valve member 14 from exiting the valve case 12. Additionally, the retaining member 49 has a center hole which also functions as a gas inlet 50 for PCV valve 10.

Next, a mounting structure for the PCV valve 10 will be described. As shown in FIG. 1, a cylinder head 54 defines an upstream side blow-by gas passage 55 therein. The cylinder head 54 has a connection surface 54a joined with an intake manifold 57 via a connection surface 57a (see infra) such that a downstream side end portion of the upstream side blow-by gas passage 55 opens at the connection surface 54a. An upstream end of the upstream side blow-by gas passage 55 is in fluid communication with a ventilation space (not shown) for the blow-by gas, such as crankcase or oil separator chamber through which the blow-by gas flows from the engine. For example, the cylinder head 54 may be made from an aluminum alloy. The cylinder head 54 has suction ports (not shown) and exhaust ports (not shown), which are in fluid communication with combustion chambers. In addition, the cylinder head 54 is provided with other components, such as a suction valve and an exhaust valve. The engine is formed as a multiple cylinder engine, such as 4-cylinder engine.

The intake manifold 57 defines a downstream side blow-by gas passage 58 therein. The intake manifold 57 has a connection surface 57a joined with the cylinder head 54 via the connection surface 54a (see supra) such that the upstream end of the downstream side blow-by gas passage 58 opens at the connection surface 57a of the intake manifold 57. A downstream end of the downstream side blow-by gas passage 58 is in fluid communication with an intake passage, such as a distribution passage in the intake manifold 57 or an internal space of a surge tank. The intake manifold 57 is made from, e.g., a resin material. The intake manifold 57 includes other various structures, such as the surge tank, into which intake air (fresh air) is introduced, as well as the distribution passage, where said passage is in communication with the downstream side of the surge tank and is configured to distribute the intake air of the surge tank to the suction ports of the cylinder head 54.

The cylinder head 54 and the intake manifold 57 are fastened to each other via their respective connection surfaces 54a and 57a, by a coupling means, such as screwing, clipping, or snap-fit. Thus, the connection surface 54a of the cylinder head 54 and the connection surface 57a of the intake manifold 57 are coupled with each other such that the respective connection surfaces 54a and 57a are in direct engagement contacting with each other. The cylinder head 54 is connected with the intake manifold 57 such that the downstream end portion of the upstream side blow-by gas passage 55 and the upstream end portion of the downstream side blow-by gas passage 58 are then connected with each other in a linear and coaxial manner, as shown in FIG. 1. Thus, a continuous blow-by gas passage is formed for returning the blow-by gas from the engine side to the air intake system.

At the interior of the connection surface 54a of the cylinder head 54, a fitting hole 60 is formed. Hole 60 is defined by a hollow cylindrical space for a lengthwise portion of the blow-by gas passage 55 in the longitudinal axial direction with an increased inner diameter compared to the rear portion of the blow-by gas passage 55. The fitting hole 60 and the rest of the blow-by gas passage 55 are coaxially positioned. At a rear side of the fitting hole 60, a passage hole portion 62 is coaxially formed for a lengthwise portion in the longitudinal axial direction of the blow-by gas passage 55 rearwards from fitting hole 60 to define a hollow cylindrical space having a smaller inner diameter than the fitting hole 60. At the connection surface 57a of the intake manifold 57, a fitting hole 64 is formed to define a hollow cylindrical space with an increased inner diameter portion of the open end part of the downstream side blow-by gas passage 58. The fitting hole 64 and the downstream side blow-by gas passage 58 are coaxially positioned. At a front side of the fitting hole 64, a passage hole 66 of the blow-by gas passage 58 is coaxially formed to define a hollow cylindrical space having a smaller inner diameter compared to the fitting hole 64.

At the connection interface between the cylinder head 54 and the intake manifold 57, the PCV valve 10 extends in both of the blow-by gas passages 55 and 58. More specifically, the large diameter portion 20 of the valve case 12 is disposed in the fitting hole 60 of the upstream side blow-by gas passage 55 of the cylinder head 54 and the front small diameter portion 21 of the valve case 12 is disposed in the fitting hole 64 of the blow-by gas passage 58, whereas the rear small diameter portion 22 of the valve case 12 is disposed not at the connection interface, but in the passage hole 62 of the upstream side blow-by gas passage 55. Thus, the gas inlet 50 of the valve case 12 is in fluid communication with the upstream side blow-by gas passage 55 of the cylinder head 54.

The first O-ring 28 elastically supports the large diameter portion 20 of the valve case 12 against the cylinder head 54 and provides an elastic seal between the valve case 12 and the cylinder head 54. The fitting hole 60 of the blow-by gas passage 55 of the cylinder head 54 and the large diameter portion 20 of the valve case 12 define a small radial clearance there-between. The passage hole 62 and the rear small diameter portion 22 of the valve case 12 define a space 68 formed by a radially predetermined gap there-between (see FIG. 2) such that the space 68 is formed extending along the entire radial periphery of the portion 22, forming a circular cylindrical shape extending lengthwise in the longitudinal axial direction, and having an annular cross-section. The space 68 has an open end at the upstream side such that the blow-by gas flows into the space 68 from the upstream side blow-by gas passage 55. A radial length of the space 68, i.e., a radial distance between the passage hole 62 and the rear small diameter portion 22 is greater than a radial distance between the fitting hole 60 and the large diameter portion 20. The space 68 is formed such that a downstream side end part of the space 68 is adjacent to the measuring passage 47 in the lengthwise direction, of the longitudinal axis of the valve.

The front small diameter portion 21 of the valve case 12 is disposed in the fitting hole 64 of the downstream side blow-by gas passage 58 of the intake manifold 57. The tip end portion 24 of the valve case 12 extends at its front most portion into the passage hole 66 of the downstream side blow-by gas passage 58. Thus, the gas outlet 34 of the valve case 12 is in fluid communication with the downstream side blow-by gas passage 58 of the intake manifold 57. The second O-ring 32 elastically supports the front small diameter portion 21 of the valve case 12 on the intake manifold 57 and provides an elastic seal between the intake manifold 57 and the valve case 12. The fitting hole 64 of the downstream blow-by gas passage 58 and the front small diameter portion 21 which is fitted in both blow-by gas passages 55 and 58 define a small radial clearance there-between. The passage hole 66 and the tip end portion 24 of the valve case 12 define a space there-between having a predetermined radial length.

As described above, the PCV valve 10 is housed between the cylinder head 54 and the intake manifold 57. A rear end surface of the large diameter portion 20 is positioned to be close to or abut a rear end surface of the fitting hole 60 of the cylinder head 54. A front end surface of the large diameter portion 20 is positioned to be close to or abut the connection surface 57a of the intake manifold 57.

Next, the operation of the PCV valve 10 will be described. While the engine is running (in driving state), the negative intake pressure in the intake manifold 57 is applied to the ventilation space (not shown) of the engine for the blow-by gas via the continuous blow-by gas passage, where said passage includes the communication passage 18 of the PCV valve 10. Then, the blow-by gas is returned to the intake passage (not shown) of the intake manifold 57 via the continuous blow-by gas passage. Thus, fresh air (atmospheric air) is introduced into the ventilation space via a fresh air introduction passage (not shown).

While the blow-by gas is returned, the PCV valve 10 is operated depending on a load condition of the engine, i.e., the negative intake pressure to control the flow rate of the blow-by gas flowing through the communication passage 18 within the valve case 12. That is, the valve body 14 moves to a position where the rearwards biasing force of the valve spring 16, an inner pressure of the crankcase and the negative intake pressure are all balanced with respect to each other. The flow rate of the blow-by gas is controlled based on the position of the valve member 14. When a reverse flow is generated due to backfire from the combustion chambers (not shown) of the engine or the like, the PCV valve 10 is closed. More specifically, when this occurs, the flange 43 of the valve member 14 abuts the retaining member 49 of the valve case 12 to close the gas inlet 50.

According to the PCV valve 10, the measuring passage 47 is positioned upstream of the seal members, i.e., the O-rings 28, 32 lengthwise in the longitudinal axial direction of the PCV valve 10, and the space 68 is formed between the cylinder head 54 and the valve case 12 such that the space 68 is formed in a cylindrical shape extending lengthwise in the longitudinal axial direction and having an upstream open end. Thus, the blow-by gas flows into the space 68 between the cylinder head 54 and the valve case 12, thereby allowing the heat of the blow-by gas to be efficiently transferred to the measuring passage 47 positioned upstream of the seal members. Accordingly, the measuring passage 47 of the PCV valve 10 can easily receive heat from its proximity to the blow-by gas in the space 68, so that the measuring passage 47 can be effectively warmed. Therefore, when freeze does occur at the measuring passage 47, time required to eliminate the freeze can be shortened.

In addition, a sliding part between the rear small diameter portion 22 of the valve case 12 and the flange 43 of the valve member 14 is effectively warmed as it is radially adjacent to the space 68. Thus, when freeze occurs at the sliding part, the time required to eliminate the freeze can be shortened.

The downstream end of the space 68 is positioned lengthwise adjacent in the longitudinal axial direction of the valve, to the measuring passage 47. Thus, heat of the blow-by gas can be more efficiently transferred from the space 68 to the measuring passage 47 of the PCV valve 10.

The measuring passage 47 is located upstream of the first O-ring 28 lengthwise in the longitudinal axial direction of the PCV valve 10. Thus, compared with a case where the measuring passage 47 is positioned downstream of the first O-ring 28 in the axial direction of the PCV valve 10, if the length L3 between the upstream end of the valve case 12 and the measuring passage 47 is same, the length L2 between the upstream end of the valve case 12 and the first O-ring 28 is longer, since the measuring passage 47 is upstream of the first O-ring 28. As a result, the axial length L1 of the space 68 can be increased, such that a surface area of the rear small diameter portion 22, which receives heat of the blow-by gas through the space 68 can be increased.

This disclosure is not limited to the above-described embodiment. For example, the O-rings 28, 32 can be replaced with other seal members having the same function with O-ring. The valve case 12 of the PCV valve 10 may be additionally elastically supported on the cylinder head 54 via at least one seal member. Thus, for example, the valve case 12 may be elastically supported on the cylinder head 54 via the O-rings 28 and 32.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A PCV valve mounting structure comprising:
    a cylinder head of an engine;
    an intake manifold coupled to the cylinder head to form a continuous blow-by gas passage;
    a PCV valve disposed in the blow-by gas passage and configured to control a flow rate of a blow-by gas in the blow-by gas passage based on a negative intake pressure of the engine, wherein the PCV valve comprises a valve case; and
    a seal member elastically radially positioned between the valve case and the cylinder head and supporting the valve case within the blow-by gas passage;
    wherein the PCV valve has a measuring passage configured to adjust the flow rate of the blow-by gas and positioned upstream of the seal member in the lengthwise longitudinal axial direction of the PCV valve;
    wherein an annular space between the cylinder head and the valve case extends from an upstream end of the valve case and has an upstream open end in communication with the measuring passage; and
    wherein the valve case is sealingly engaged with the cylinder head only on a downstream side of the measuring passage in the lengthwise longitudinal axial direction.

2. The PCV valve mounting structure according to claim 1, wherein a downstream end of the annular space is axially positioned adjacent to the measuring passage in the longitudinal axial direction of the PCV valve.

* * * * *